Aug. 4, 1964  J. P. STEFAN  3,143,187
LUBRICATING SYSTEM
Filed Nov. 26, 1963
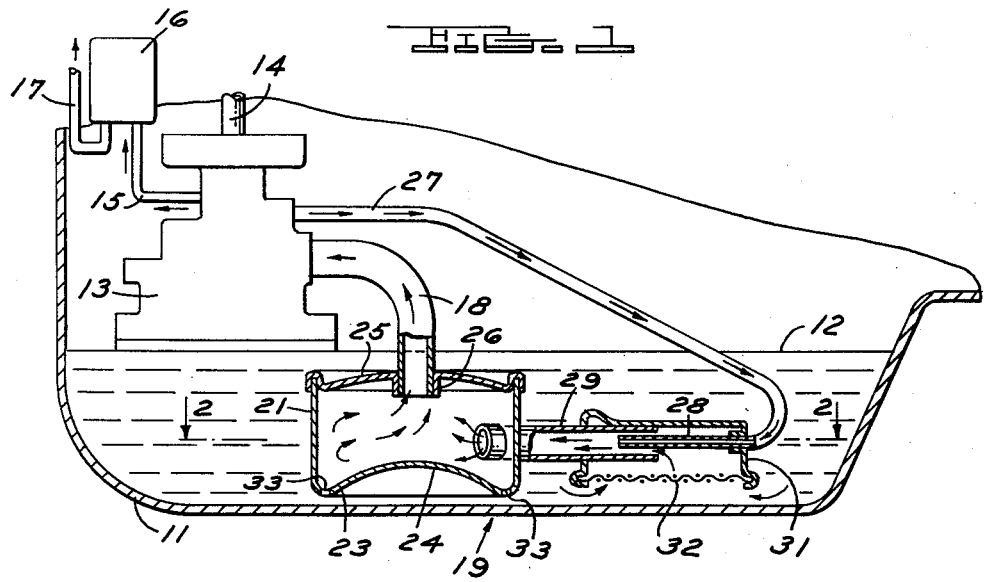
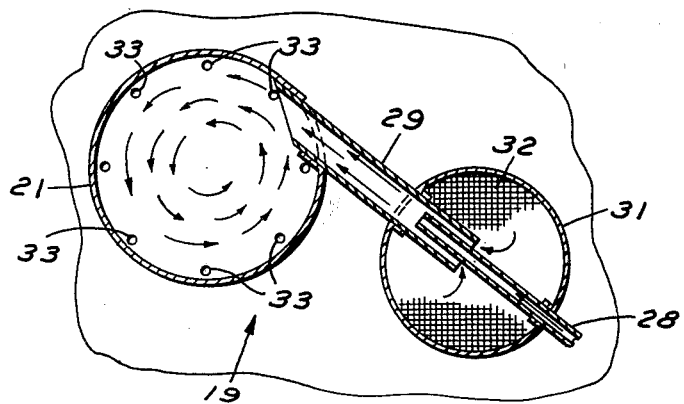
JOHN P. STEFAN
INVENTOR.
BY John R. Faulkner
Ernest A. Beutler
ATTORNEYS 3,143,187
LUBRICATING SYSTEM
John P. Stefan, Birmingham, Mich., assignor to Ford Motor Company, Dearborn, Mich., a corporation of Delaware
Filed Nov. 26, 1963, Ser. No. 325,893
8 Claims. (Cl. 184—6)

This invention relates to a lubricating system and more particularly to an improved lubricant filtration system.

Some form of filtration is normally employed in a lubricating system to prevent abrasive particles from coming into contact with the lubricated parts. In the most common manner of filtration, the lubricant is passed through a filter that employs a filtration medium for removing the particles. The filtrate may be of a throwaway type that is replaced when it is filled with contaminants or it may be cleaned and reused. The filtration medium should be fine enough to remove the smallest particles that could damage the moving parts.

The filter may rapidly accumulate particles to a point at which it becomes clogged, particularly if it is fine, under severe operating conditions. The clogged filter must be serviced to insure continued lubrication if a bypass is not used or to prevent undue wear of the lubricated parts if the clogged filter is bypassed. It is desirable, however, to maintain as great a service interval as possible without a decrease in filter efficiency.

The need for lubricant filters with long service intervals is particularly important in connection with the engines of motor vehicles where it is desired to reduce maintenance as much as possible. The engine of a motor vehicle, however, is subjected to very severe operating conditions since the lubricating system is generally open to the atmosphere to provide crankcase ventilation. Although crankcase ventilation is desirable, it permits air and contaminants to enter the crankcase and become entrapped in the lubricating oil.

It is, therefore, a principal object of this invention to provide a lubricant filtration system that extends the service interval.

The life of a lubricant filter can be extended through a system of prefiltration that removes the coarser particles from the lubricant before they enter the filter. Only the finer particles enter the filter and its life is significantly increased. If an additional, coarser filtration medium is employed to remove the larger particles, however, the additional filter also requires service.

It is, therefore, a further object of this invention to provide a filtration system for removing heavier particles from a lubricant that does not rely upon a filtration medium.

A lubricating system embodying this invention has a lubricant sump and pump that is adapted to pump a quantity of lubricant in excess of the normal lubricating requirements of the system. A substantially circular casing is positioned in the sump. A pump inlet extends from the center of the circular casing to the inlet side of the pump. A bypass conduit extends from the outlet side of the pump to the periphery of the circular casing. The excess oil flowing through the bypass conduit causes a generally rotary motion of the lubricant within the circular casing to drive heavier particles carried by the lubricant away from the pump inlet.

Further objects and advantages of this invention will become more apparent when considered in conjunction with the accompanying drawings, wherein:

FIGURE 1 is a cross-sectional view of the crankcase of an internal combustion engine embodying this invention;

FIGURE 2 is a cross-sectional view taken generally along line 2—2 of FIGURE 1.

Referring now in detail to the drawings, the crankcase or lubricant sump of an internal combustion engine is indicated generally by the reference numeral 11. The crankcase 11 is filled with oil to a normal level, indicated by the line 12. An oil pump 13 depends into the crankcase 11 and has a drive shaft 14 that is driven by the engine (not shown).

The oil pump 13 is adapted to pump a quantity of oil that substantially exceeds the normal lubricating requirements of the engine. The lubricating portion of the pumped oil flows through an outlet conduit 15 to an oil filter 16. The oil filter is of the full-flow type, that is, all of the oil flowing to the lubricated parts of the engine first passes through the oil filter 16. The oil filter 16 discharges into the engine lubricating system through an outlet conduit 17.

Oil is drawn into the oil pump 13 from an inlet conduit 18. The coarser particles contained within the lubricating oil are removed from the oil before it enters the pump 13 to preclude entrapment in the oil filter 16 by a separator, indicated generally by the reference numeral 19. The separator 19 is cylindrical in shape and has a cylindrical outer wall 21 that is disposed with its longitudinal axis in a substantially vertical direction. The outer wall 21 terminates at an integral lower wall 23 that has a raised central portion 24. The upper end of the separator 19 is closed by an upper wall 25 that has an opening 26 positioned along the separator's longitudinal axis. The opening 26 receives the inlet side of the oil pump inlet conduit 18.

A generally rotary motion is imparted to the oil in the separator 19 so that the heavier particles carried by the oil will be driven to the outside of the separate away from the inlet conduit 18. The rotary motion is generated in the manner now to be described. The excess oil pumped by the pump 13 is routed through a first bypass conduit 27, the outlet end 28 of which terminates below the oil level in the crankcase 11. The outlet end 28 also extends into the inlet end of a larger, secondary bypass conduit 29. The secondary bypass conduit 29 extends partially into the separator 19 through the cylindrical outer wall 21 in a substantially tangential direction (FIGURE 2).

An inlet casing 31 having a generally inverted cup shape encircles the outlet end 28 of the first bypass conduit 27 and the inlet end of the secondary bypass conduit 29. The conduits pass through apertures in the respective sides of the inlet casing 31. A relatively coarse filter screen 32 is held across the opening of the lower end of the inlet casing 31.

In operation, the pump 13 discharges oil through the conduit 15 and oil filter 16 into the engine's lubricating system. The excess oil flows through the first bypass conduit 27 into the enlarged inlet opening of the secondary bypass conduit 29. Because the conduit 27 extends at least in part into the enlarged secondary bypass conduit 29, the venturi action creates a decreased pressure at the inlet to the secondary bypass conduit 29. The decreased pressure at the inlet to the secondary bypass conduit 29 causes oil to be drawn upwardly into the inlet casing 31 through the screen 32. The screen 32 will remove relatively large particles from the oil. The oil is then drawn into the secondary bypass conduit 29 at a comparatively rapid rate.

The oil is discharged from the secondary bypass conduit 29 into the separator 19 in a generally tangential direction to impart a rotary motion to the oil within the separator 19. The direction of oil flow is indicated by the arrows in the figures. The rotary motion of the oil in the separator 19 causes a centrifugal force to drive heavier particles carried by the oil toward the cylindrical outer wall 21. Since the velocity of the oil is less in this area, the heavier particles will fall to the bottom of the separator 19. A plurality of holes 33 are formed at spaced intervals around the periphery of the lower wall 23 so that the separated particles may return to the crankcase 11. The pressure within the separator 19 is also higher than the pressure within the crankcase 11 so that the separated particles will be driven from the separator 19 to make periodic cleaning unnecessary. Since the heavier particles are driven away from the inlet conduit 18, they cannot enter the lubricating system of the engine.

It is to be understood that the invention is not limited to the exact construction shown and described, but that various changes and modifications may be made without departing from the spirit and scope of the invention, as defined by the appended claims.

I claim:

1. In a lubricating system, a lubricant sump, a pump adapted to pump a quantity of lubricant in excess of the normal lubricating requirements of the system, a substantially circular casing in said sump, an inlet conduit extending generally from the center of said circular casing to the inlet side of said pump, and a bypass conduit in communication with the outlet side of said pump for receiving the excess lubricant pumped by said pump, the outlet of said bypass conduit being positioned at the periphery of said circular casing to impart a generally rotary motion to the lubricant within said circular casing for driving heavier particles carried by the lubricant away from the pump inlet.

2. A lubricating system as defined by claim 1 wherein the outlet of said bypass conduit is positioned tangential to said circular casing.

3. In a lubricating system, a lubricant sump, a pump adapted to pump a quantity of lubricant in excess of the normal lubricating requirements of the system, a substantially cylindrical casing positioned in said sump with its longitudinal axis extending in a vertical direction, an inlet conduit extending from the axis of said cylindrical casing to the inlet side of said pump, and a bypass conduit in communication with the outlet side of said pump for receiving the excess lubricant pumped by said pump, the outlet of said bypass conduit extending into said cylindrical casing at a substantially tangential direction thereto to impart a generally rotary motion to the lubricant within said cylindrical casing for driving heavier particles carried by the lubricant away from the pump inlet.

4. A lubricating system as defined by claim 3 wherein the periphery of the lower wall of said casing is in fluid communication with the sump whereby the heavier particles separated from the lubricant may return to the sump.

5. In a lubricating system, a lubricant sump, a pump adapted to pump a quantity of lubricant in excess of the normal lubricating requirements of the system, an outlet conduit extending from the outlet side of said pump to said lubricating system, a lubricant filter in said outlet conduit, a substantially circular casing in said sump, an inlet conduit extending generally from the center of said circular casing to the inlet side of said pump, and a bypass conduit in communication with the outlet side of said pump for receiving the excess lubricant pumped by said pump, the outlet of said bypass conduit being positioned at the periphery of said circular casing to impart a generally rotary motion to the lubricant within said circular casing for driving heavier particles carried by the lubricant away from the pump inlet.

6. In a lubricating system, a lubricant sump, a pump adapted to pump a quantity of lubricant in excess of the normal lubricating requirements of the system, a substantially circular casing in said sump, an inlet conduit extending generally from the center of said circular casing to the inlet side of said pump, a first bypass conduit in communication at its inlet end with the outlet side of said pump for receiving the excess lubricant pumped by said pump, the outlet end of said first bypass conduit terminating in said sump below the lubricant level, and a second bypass conduit having an inlet end of a larger size than the outlet end of said first bypass conduit, said outlet end of said first bypass conduit extending at least in part into the inlet end of said second bypass conduit for creating a venturi action to draw lubricant from said sump into said second bypass conduit, the outlet end of said second bypass conduit being positioned in the periphery of said circular casing to impart a generally rotary motion to the lubricant within said circular casing for driving heavier particles carried by the lubricant away from the pump inlet.

7. In a lubricating system, a lubricant sump, a pump adapted to pump a quantity of lubricant in excess of the normal lubricating requirements of the system, an outlet conduit extending from the outlet side of said pump to said system, a lubricant filter positioned in said outlet conduit, a substantially circular casing in said sump, an inlet conduit extending generally from the center of said circular casing to the inlet side of the pump, a first bypass conduit in communication at its inlet end with the outlet side of said pump for receiving the excess lubricant pumped by said pump, the outlet end of said first bypass conduit terminating in said sump below the lubricant level, and a second bypass conduit having an inlet end of a larger size than the outlet end of said first bypass conduit, said outlet end of said first bypass conduit extending at least in part into the inlet end of said second bypass conduit to create a venturi action for drawing lubricant from said sump into said second bypass conduit, the outlet of said bypass conduit being positioned at the periphery of said circular casing and extending tangentially thereto to impart a generally rotary motion to the lubricant within said circular casing for driving heavier particles carried by the lubricant away from the pump inlet.

8. In a lubricating system, a lubricant sump, a pump adapted to pump a quantity of lubricant in excess of the normal lubricating requirements of the system, a substantially circular casing in said sump, an inlet conduit extending generally from the center of said circular casing to the inlet side of said pump, a first bypass conduit in communication at its inlet end with the outlet side of said pump for receiving the excess lubricant pumped by said pump, the outlet end of said first bypass conduit terminating in said sump below the lubricant level, a second bypass conduit having an inlet end of a larger size than the outlet end of said first bypass conduit, the outlet end of said first bypass conduit extending at least partially into the inlet end of said second bypass conduit, an inlet casing surrounding the inlet end of said second bypass conduit and opening into said sump, and a coarse filtration screen positioned across the opening of said inlet casing, the outlet end of said second bypass conduit being positioned at the periphery of said circular casing to impart a generally rotary motion to the lubricant within said circular casing for driving heavier particles carried by the lubricant away from the pump inlet.

References Cited in the file of this patent
UNITED STATES PATENTS
2,624,422    Molyneux  ---------------- Jan. 6, 1953